United States Patent
Milosiu et al.

(10) Patent No.: US 8,738,028 B2
(45) Date of Patent: May 27, 2014

(54) METHOD AND RADIO DEVICE FOR DETECTING A MOVEMENT

(75) Inventors: Heinrich Milosiu, Uttenreuth (DE); Frank Oehler, Adelsdorf (DE); Josef Sauerer, Herzogenaurach (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 15 days.

(21) Appl. No.: 13/394,597

(22) PCT Filed: Sep. 6, 2010

(86) PCT No.: PCT/EP2010/005612
§ 371 (c)(1),
(2), (4) Date: Apr. 5, 2012

(87) PCT Pub. No.: WO2011/026653
PCT Pub. Date: Mar. 10, 2011

(65) Prior Publication Data
US 2012/0184296 A1    Jul. 19, 2012

(30) Foreign Application Priority Data
Sep. 7, 2009 (EP) .................................. 09075416

(51) Int. Cl.
*H04W 24/00* (2009.01)
(52) U.S. Cl.
USPC ............... 455/456.1; 340/870.01; 340/870.22
(58) Field of Classification Search
USPC ............... 455/404.2, 456.1, 456.2, 456.3; 340/870.01–870.4
See application file for complete search history.

(56) References Cited

U.S. PATENT DOCUMENTS

| 5,572,221 A | * | 11/1996 | Marlevi et al. | ................ 342/452 |
| 6,157,592 A | * | 12/2000 | Kriz et al. | ................ 367/127 |

(Continued)

FOREIGN PATENT DOCUMENTS

| EP | 0399845 A2 | 5/1990 |
| JP | 2009/065394 A | 3/2009 |
| WO | WO 2009/033001 A2 | 3/2009 |

OTHER PUBLICATIONS

Song et al.: SVATS: A Sensor-Network-Based Vehicle Anti-Theft System, IEEE—Infocom 2008, pp. 171-175, Apr. 13, 2008.

(Continued)

*Primary Examiner* — Magdi Elhag
(74) *Attorney, Agent, or Firm* — Jacobson Holman PLLC

(57) ABSTRACT

The invention relates to a method and a radio device for detecting a movement of at least one receiver, wherein the radio signals are sent from at least one stationary transmitter to the at least one receiver and the received signals are evaluated for determining a movement. The radio signals are designed as a specified bit sequence modulated onto a high-frequency carrier and are demodulated by the receiver to form a receiving sequence that is correlated to determine correspondence with the specified bit sequences stored as a reference sequence. Dependent on the correspondence or errors that can be determined by the correlation, quality indicators for the receiving field strength of the received radio signals are determined, wherein the radio signals having the specified bit sequence are sent from the transmitter having at least two different transmission powers in a series. The series is repeated at temporal intervals and the quality indicators of the received sequences of the series are evaluated to determine a movement of the receiver in relation to the transmitter.

12 Claims, 4 Drawing Sheets

(56) References Cited

U.S. PATENT DOCUMENTS

Figure 1:
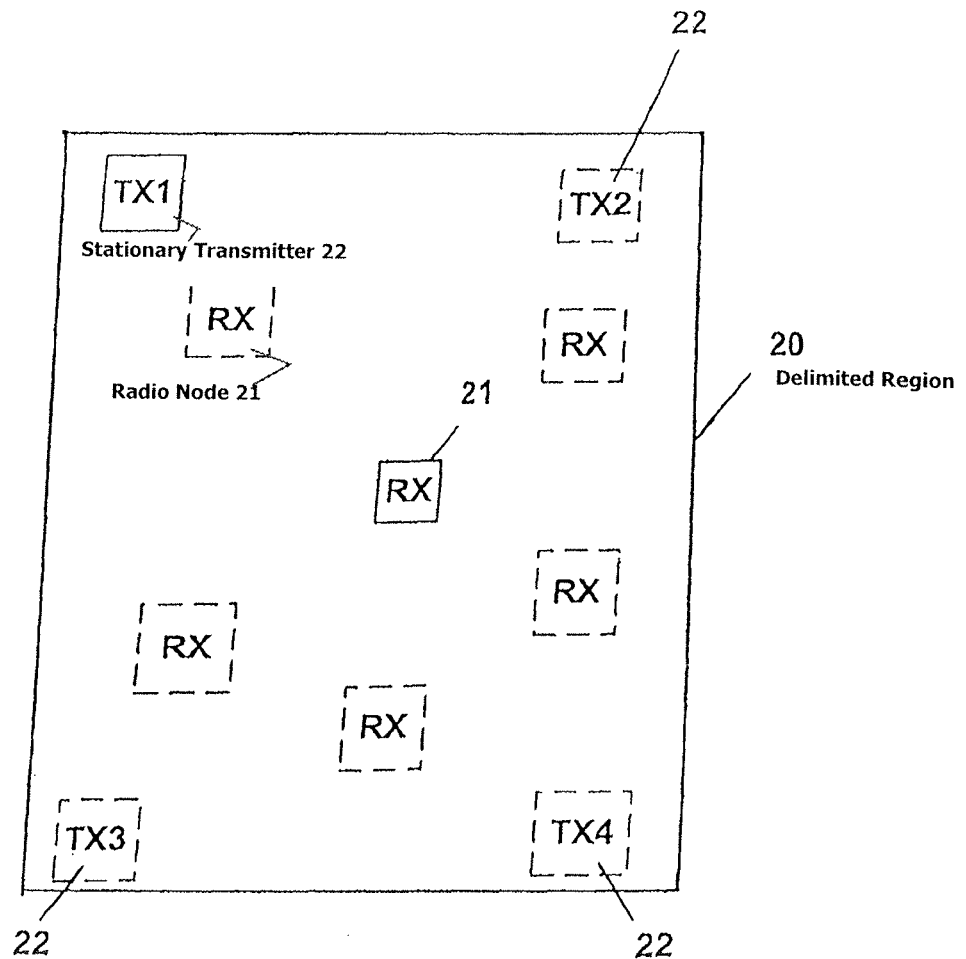

| | | | |
|---|---|---|---|
| 7,032,139 B1* | 4/2006 | Iryami et al. | 714/704 |
| 7,398,099 B2* | 7/2008 | Brouwer | 455/522 |
| 2002/0118780 A1* | 8/2002 | Hurley et al. | 375/347 |
| 2003/0153331 A1* | 8/2003 | Alger | 455/456 |
| 2005/0059350 A1* | 3/2005 | Sano | 455/67.7 |
| 2005/0117070 A1* | 6/2005 | Wu et al. | 348/725 |
| 2007/0247367 A1 | 10/2007 | Anjum et al. | |
| 2008/0014890 A1 | 1/2008 | Hardacker et al. | |
| 2008/0151103 A1* | 6/2008 | Asamura et al. | 348/448 |
| 2008/0232281 A1 | 9/2008 | Pahlavan et al. | |
| 2009/0088087 A1* | 4/2009 | Dishongh et al. | 455/90.1 |
| 2009/0147837 A1* | 6/2009 | Lau | 375/219 |

OTHER PUBLICATIONS

Paschalidis et al.: Landmark-Based Position and Movement Detection of Wireless Sensor Network Devices; 46th Annual Allerton Conf., pp. 7-14, Sep. 2008.

* cited by examiner

METHOD AND RADIO DEVICE FOR DETECTING A MOVEMENT

This is a national stage of PCT/EP2010/005612 filed Sep. 6, 2010 and published in German, which claims the priority of European number 09 075 416.9 filed Sep. 7, 2009, hereby incorporated by reference.

The invention relates to a method and a radio device for detecting a movement of at least one current-saving receiver.

In order to give information about distances or movements in radio systems, it is known to evaluate reception field strengths or values dependent thereon. In order to determine a position of a mobile radio node, for example in one plane, a plurality of for example at least three distance estimates is required.

Furthermore, locating methods based on so-called Zigbee technology by Texas Instruments are known. The integrated radio receivers which are used (e.g. CC2420) have however such a high current consumption that an operation with round cells is restricted to less than one day.

In integrated radio receivers, it is widespread to provide the quality of the received signal as a so-called RSSI signal (received signal strength indicator) for the user. Generally an analogue voltage which corresponds to the logarithmic level dimension of the amplitude of the high-frequency received carrier signal is thereby produced. Production of such an RSSI signal is implemented with a cascade of logarithmic amplifier cells, the individual characteristic lines of which are added together to form the total characteristic line with a greater input level dynamic. In order to produce the RSSI signal, the high-frequency reception part of the radio receiver is switched on. The current requirement of analogue RSSI circuits which make available a signal for the quality of the received signal does not permit years of operation with round cell batteries. A series of logarithmic amplifiers is commercially available as individual ICs for various frequency ranges, the most economical IC which operates up to 2.7 GHz and allows an input level between −21 dBm and +5 dBm being indicated with a current consumption of 1.1 mA. The operational duration of a radio receiver with such RSSI components is restricted to below 8 days for a round cell operation of the capacity 210 mAh. The relatively high current consumption firstly precludes energy-saving, battery-operated applications unless switch-off concepts, such as polling, are used.

In radio node networks, also termed sensor node networks, which are based on standard transceivers, the so-called polling is used in order to save current. The receivers are thereby activated only at specific times for a short period. During this time, the communication is concluded, thereafter the receiver is switched off again. Hence the receiver is inactive for most of the time and thus not reachable for a radio connection. The result is an increase in reaction time or undesired latent periods. This leads for example to the fact that transmission must take place for a fairly long time until the radio receiver operated in polling mode has received the message. The result can be that the radio channel is from time to time constantly occupied. In order to be able to achieve operational durations of the order of magnitude of one year, such a receiver of a standard transceiver must remain switched off for one minute in order to be switched on briefly thereafter, i.e. of the order of magnitude of <0.1 s, this applying for an average current of approx. 28 µA.

As referred to already, the current consumption of PLL-based standard radio receivers which provide an RSSI signal is above 10 mA. Such receivers can nevertheless be used with the polling method with battery operation, however, in wireless networks which operate with polling, the reaction time of a radio node is equally increased with a reducing duty cycle which is again intolerable for many applications.

Current-saving receivers can be produced for example as superregenerative or detector receivers. The achievable current consumptions are approx. 100 µA. In order to keep the current consumption low, the current-saving receiver has moderate to low sensitivities and reduced selectivity. The disadvantages of increased latency or reaction times in the polling methods may hereby not apply if a long-term operation of such a current-saving radio receiver is possible in the application.

Such current-saving receivers are normally used as wake-up receiver in the radio node networks which, upon receiving a special activation sequence, wakens up the remaining system connected and operated in the current-saving mode (e.g. sleep mode). If a lithium round cell with 1,000 mAh is used for the current supply of such a wake-up receiver, then a 100 µA receiver can be operated constantly switched on for 14 months.

The object therefore underlying the invention is to produce a method and a radio device for current-saving detection of a movement of at least one current-saving receiver, with which a significant movement of the receiver or of a mobile radio node including this can be detected over a long period of time in a relative simple manner without a complex computing operation.

This object is achieved according to the invention by the features respectively of the independent claims.

Advantageous developments and improvements are possible as a result of the measures indicated in the sub-claims.

As a result of the fact that, in the method or in the radio device for current-saving detection of a movement of at least one current-saving receiver, the radio signals which are transmitted from at least one transmitter to the at least one receiver and which are modulated as prescribed bit sequences onto a high-frequency carrier are demodulated in a received sequence and as a result of the fact that, in a subsequent correlator unit, the received sequence is correlated with a reference sequence which is designed and stored corresponding to the prescribed bit sequence, a quality constant signal can be determined for the received field strength at the receiver as a function of correspondences or errors established by the correlation, wherein furthermore, by transmitting the radio signals at the prescribed bit sequence at least two different transmission powers in a sequence and repeating the sequence at temporal intervals, on the one hand, quality constants of the received sequences can be determined, as a function of time and, on the other hand, an increase in the distance ranges is achieved by the graduated transmission powers, in which distance ranges the presence of movements of the receiver can be determined by an evaluation device as a function of the quality constants.

The correspondences established by correlation stand for an error-free reception in which all the bits of the received bit sequence are the same as the expected bit sequence. The errors established by the correlation represent a faulty transmission and occur when differences relative to the expected correlation sequence result in the received correlation sequence.

The possibility of estimating, with a value of the quality constant (QM value), a movement within different spacing ranges (spacing classes) depends essentially upon the code length, i.e. upon the length of the prescribed bit sequence. For example in the case of variation of the values of the quality constant with a transmission power x, different, e.g. three with a bit sequence of 32 bits, with somewhat more uncertainty four different spacings or distances of the receiver from the transmitter, can thereby be estimated. Upon increasing the number of transmission powers, the number of spacing classes can be correspondingly increased (e.g. <=5 m, 10 m, >=20 m), within which a movement of the receiver or radio node can be detected, i.e. an extension of the "RSSI" dynamics is achieved; above all in close range, only a few transmission errors occur so that an "artificial reduction" is sensible. By extending the prescribed bit sequence, for example to 64 bits, finer differences are possible, e.g. 6 spacing classes, such as <=3 m, 5 m, 8 m, 13 m, 20 m, >30 m. If a graduation of five transmission powers is undertaken, five QM values are obtained and, if the bit sequence is chosen to be three spacing regions, then up to at most 15 spacings can be estimated. The maximum of 15 spacings is achieved when the transmission powers are adapted to the QM values and no overlappings in the assignment of QM values and transmission power to spacing results.

The evaluation device for establishing a movement from the quality constant can be integrated in the receiver or be provided externally or also be disposed partially in the receiver and partially externally. What is important is that also the evaluation device which is integrated partially or completely in the receiver is designed to save current. Digital circuits with low complexity, such as adders, comparators or the like, are suitable for this purpose. An evaluation in a complex signal processor is not required. The evaluation device can include for example also a static RAM in the radio receiver in which quality constants and/or movement and/or relative positional data are stored which, if required, are read out, for example via an active, current-consuming wireless sensor network, stored centrally and evaluated. Hence traceability of radio receivers fitted on valuable items can be undertaken. The componentry of the receiver, such as includes correlator unit, shift register and/or XOR gate, which are required for evaluation of the quality constants, have a low current consumption so that long-term operation is possible over a very long period of time with a battery supply.

In a preferred radio system, at least three stationary transmitters are provided in a region in which movements are intended to be detected. It is hence possible also to detect movement directions and possibly also relative positions. There may be mentioned as an example of application of such a system, a fair pavilion in which for instance 4 to 5 (or more) stationary transmitters are installed and a large number of radio nodes which are fitted on objects and have a current-saving receiver are provided. With the system according to the invention, it is possible to have radio-assisted theft protection or fencing off.

Preferably, a binary sequence is chosen as reference sequence and hence as prescribed bit sequence since this is easy to process. Furthermore, it is advantageous that the prescribed bit sequence or reference sequence comprises at least 8 bits. Preferably, a long bit sequence, for example with a length of 31 bits and larger, for example up to 64 bits, should be chosen since more errors can be tolerated when receiving radio signals.

For definition of the quality constant, the spacing of the actual correlation maximum is chosen at a prescribed value. It is particularly advantageous, in addition to the correlation maximum, to take into account the spacing at least one secondary maximum, i.e. the highest. The prescribed value can be determined by the maximum achievable or the best possible correlation maximum. It can also be for example zero. These criteria offer good information about the quality of the received signals, i.e. about the received field strength, in particular in the choice according to the invention of the prescribed bit sequence or the reference sequence.

In an advantageous embodiment, the correlation unit correlates the received bit sequence or received sequence with the reference sequence according to a cross-correlation function, as a result of which the determined cross-correlation function is identical to the autocorrelation function in the case of reception without interference, which autocorrelation factor can be established with the prescribed bit sequence and determined in advance. The current-saving receiver is designed with respect to its demodulation such that it can demodulate radio signals which are modulated with an OOK (on-off-keying) modulation or other multivalent amplitude modulations. This leads to the current-saving design of the receiver which requires approx. 5 µA to less than 100 µA.

It can be said altogether that the number of errors in the correlation of the receiving bit sequence with the expected bit sequence, i.e. the reference sequence, is dependent upon the signal strength at the radio receiver input. The number of errors can thereby be used as quality constant for the received field strength. The number of errors is in turn dependent upon the sensitivity of the receiver and the type and length of the bit sequence which is used (prescribed bit sequence, reference sequence).

The method presented here allows current-saving determination of the position or movement of a radio node. The presented method can be designed to be current-saving because no complex PLL synthesiser-based radio receivers are used; this applies in particular to WLAN- or Zigbee receivers. No active infrastructure of a wireless network (such as e.g. WLAN) is required. No extensive calculation methods, such as in the case of time-of-arrival (TOA or TDOA) methods need be effected. No active, synchronised radio network is required.

Transmission of location sequences in the transmitters can be used for many (moveable) current-saving radio receivers at the same time. Occupation of the radio channel during determination of the location information is very low and is the same in addition also for a large number of radio receivers which are being located.

Assignments in rooms or terrains with precisions of a few metres are possible. Further applications of the described method are detecting moving "foreign objects" in a current-saving sensor network and also establishing the "radio shielding direction" in a current-saving sensor network in order to find new optimum routing paths for multihop sensor networks. It is possible to protocol the respectively established positions in a memory of the radio node for tracking paths of radio nodes.

Figure 2:
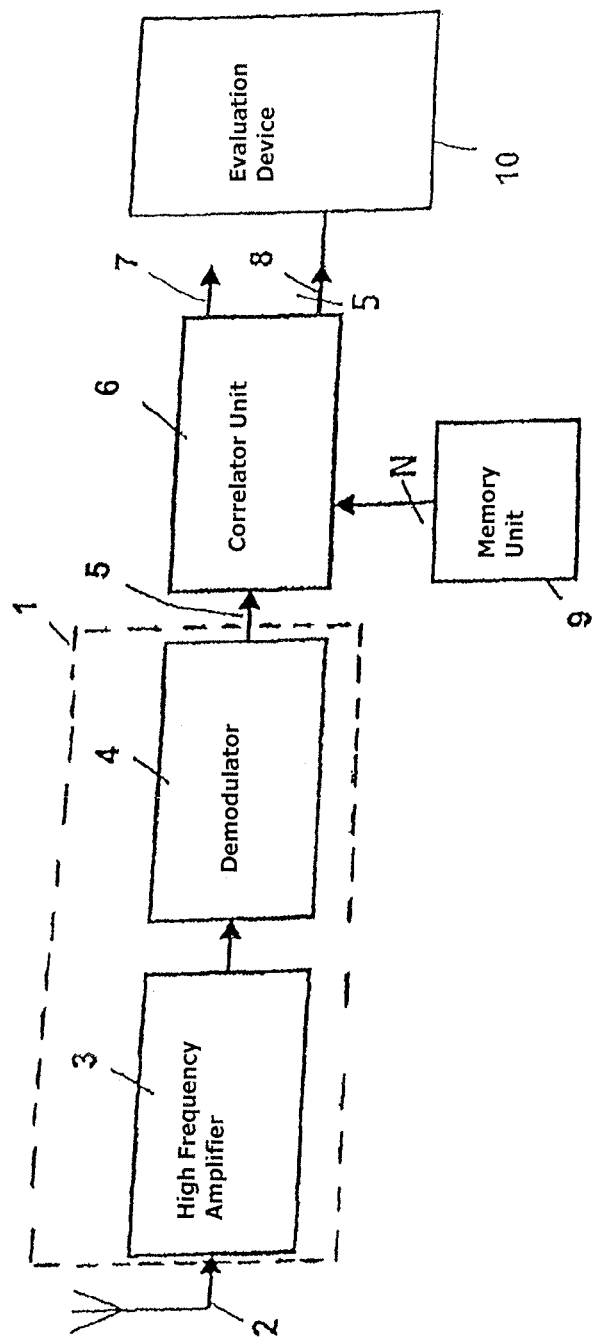
Figure 3:
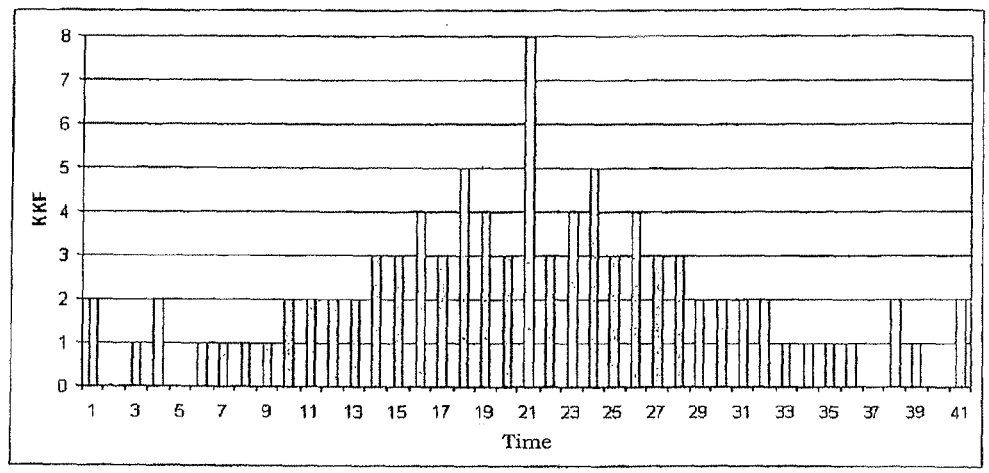
Figure 4:
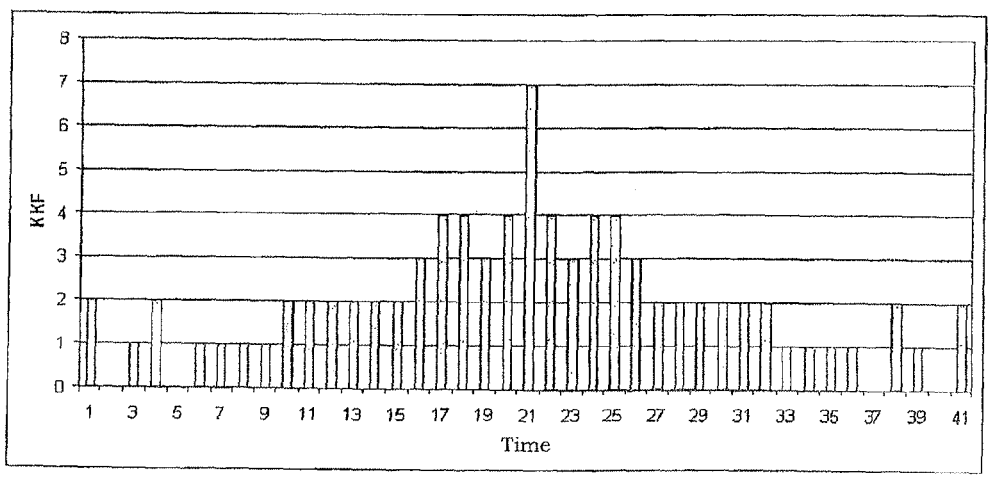
Figure 5:
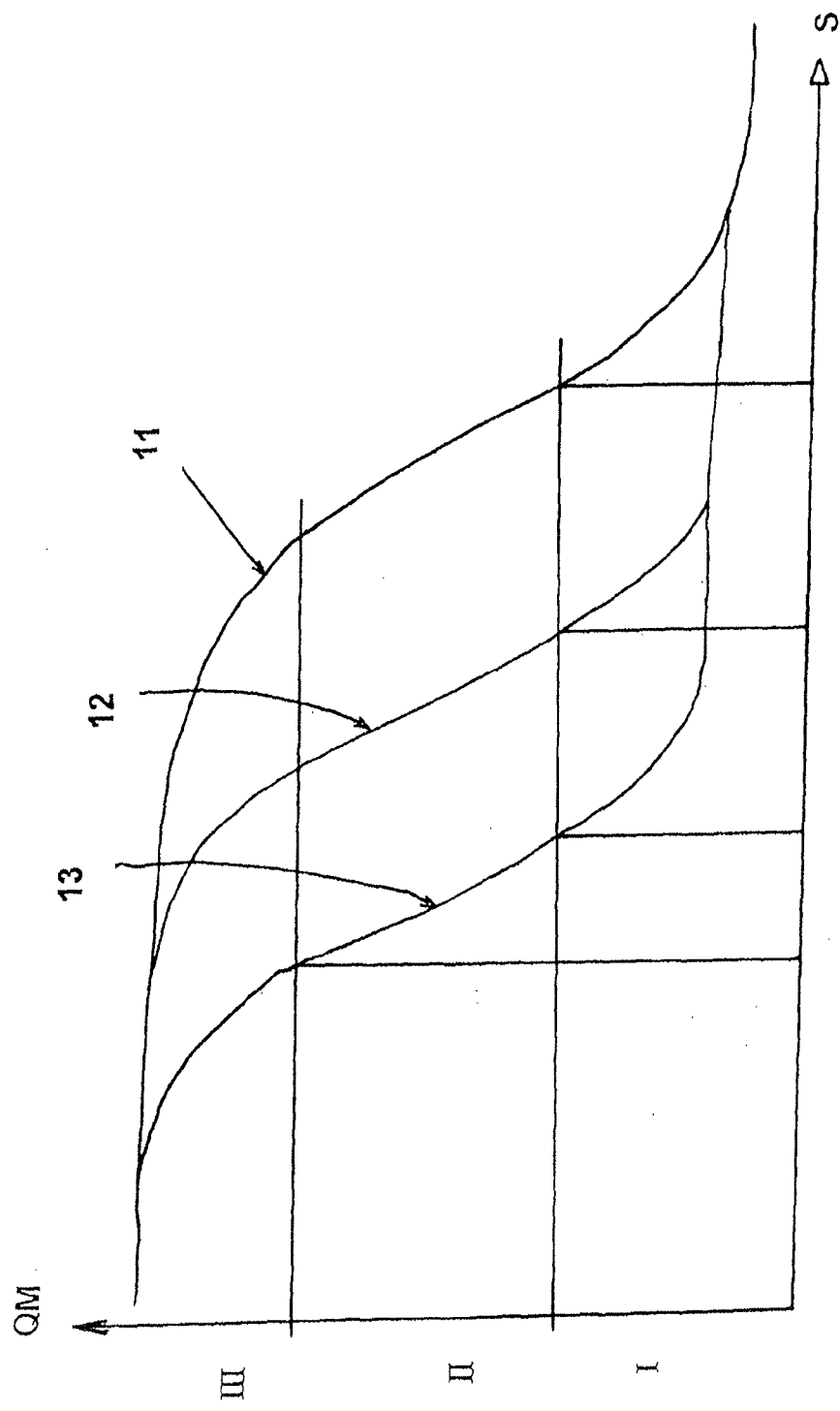

Embodiments of the invention are represented in the drawing and are explained in more detail in the subsequent description. There are shown:

FIG. 1 a schematic representation of an example of a radio system used in the present invention, FIG. 2 a schematic representation of a receiver circuit for current-saving determination of the reception quality of radio signals which is used in the method according to invention, FIG. 3 a representation of the cross-correlation function if no transmission error occurs, FIG. 4 a representation of the cross-correlation function if a transmission error occurs, FIG. 5 a representation of quality constant values as a function of the distance from the transmitter for the various transmission powers.

In FIG. 1, a radio system within a delimited region 20 having a plurality of radio nodes 21 and a plurality of stationary transmitters 22 is represented. The radio nodes 21 are connected for example to an object and can be moveable. They have respectively a current-saving receiving circuit, as is described further on in connection with FIG. 2, and normally also a transmitter circuit in order to transmit signals to other radio nodes or even to further receiver arrangements, not represented.

The represented system serves for the purpose of detecting movements and movement directions of the radio nodes 21, the description of the detection of a movement being undertaken further on firstly in connection with a stationary transmitter 22 and a radio node 21, which are both represented with continuous lines in FIG. 1.

In FIG. 2, a receiver circuit is represented schematically, as is used with a radio node 21 and which has a current-saving receiver part 1 as analogue front end. The receiver part 1 is connected to an antenna 2 which receives radio signals transmitted from the transmitter 22 as high-frequency signals (RF signals) in the form of a prescribed bit sequence with a low bit rate which is modulated onto an HF carrier signal. An OOK modulation or amplitude scanning is thereby used. The receiver part 1 is represented here schematically by a high-frequency amplifier 3 and an OOK demodulator 4 in which the received signals are converted into a received bit sequence (or received sequence) which is applied at the output 5 of the receiver part 1. The receiver part 1 is distinguished by being a very simply designed receiver, i.e. such with low circuit complexity and reduced sensitivity and also reduced selectivity. By dispensing with complex circuits and complex modulation techniques, the energy consumption of the receiver is reduced and is in the range of 5 µA to less than 100 µA. It can be produced for example as a superregenerative or detector receiver.

The receiver part 1 is connected to a correlator unit 6 which can have a digital or analogue design and has for example a shift register and logical gate, such as XOR- or XNOR gate. This correlator unit is likewise designed to be current-saving and consumes very few µA. A memory unit 9 which can also be a component of the correlator unit 6 has a reference sequence s(t) stored therein, which is identical to the prescribed bit sequence modulated onto the HF carrier signal. The correlator unit 6 can provide possibly an output signal 7 which corresponds to the input signal of the receiver part 1 and produces furthermore a signal 8 for a quality constant QM of the reception, i.e. the received field strength which corresponds to the RSSI signal in conventional radio receivers.

Such a receiver circuit according to FIG. 1 can be used for example in a radio node network as a so-called wake-up receiver which receives a special activation sequence (prescribed bit sequence) and, after evaluation in the reception part 1 and the correlator unit 6, transmits the output signal 7 to one or more radio nodes of the network for activation thereof, which radio nodes are designed as current-saving main receivers. This makes it possible to operate the radio node network in a very current-saving mode (e.g. sleep mode) and nevertheless to activate when required. The quality constant values of the radio nodes allow conclusions to be drawn, for example in the sensor network or radio node network, about the local reception conditions and can be used to determine optimum routing paths in multihop networks. A power control with transmitting radio nodes for the purpose of increasing the operating duration is obvious. In the method according to the invention or with the radio device according to the invention according to FIG. 1, the values of the quality constant are used in addition or alone to estimate a movement and a movement direction or to establish a position of a radio node, as is explained further on.

Firstly, determination of the quality constant is intended to be described.

In the correlator unit 6, a correlation function is formed from the received bit series or sequence 5 which is termed received signal e (t) and from the reference sequence s (t) which is stored in the memory unit 9 and pre-programmed. Preferably, a cross-correlation function KKF is formed as k (t). In the case of reception without interference, the received signal e (t) is identical to s (t), the reference sequence, i.e. s (t) is correlated with itself. In this ideal case, i.e. no transmission errors are present, the determined KKF is identical to the autocorrelation function AKF which is established directly with the prescribed bit sequence or reference sequence and can be determined in advance.

In order to be able to define a number of errors which can and should be used for determination of the quality constant for the received field strength, it is important that the prescribed bit sequence is chosen in a suitable manner. A bit sequence s (t) is suitable when it has a pronounced maximum for the autocorrelation function. Furthermore, a large spacing relative to the secondary maximum or to the secondary maxima is intended to be given with this AKF, both cited properties requiring to be maintained even in the case of reception with interference. For example, the spacing must be so high that the maximum is above the secondary maxima or above the secondary maxima "carpet" by several quality constant units so that the form of the cross-correlation function KKF is maintained even with transmission with interference. Furthermore, the maximum must be "stationary" relative to the temporal position in the KKF, i.e. it must not migrate if interferences are jointly received. Binary sequences can be used as bit sequence s (t) and e (t), the cross-correlation function k (t) then not being binary.

If no transmission errors are present, the correlation maximum is most pronounced and the spacing relative to the secondary maximum is likewise greatest. Each additional transmission error leads to the main maximum dropping and the secondary maxima increasing. The spacing from the main to the secondary maxima is thereby reduced.

A suitable bit sequence is for example one such in which a very good cross-correlation function is formed, for example 001111111191111111100, the spacing here relative to the secondary maximum would be 8. With two interference errors, the cross-correlation function could then appear thus: 001111123732111111100. The spacing here relative to the secondary maximum is still 4.

Since the detectable number of errors is also dependent upon the length of the bit sequence which is used, it is sensible to choose this to be as long as possible. In practice, a length of the sequence from 8 bits is sensible, then errors in the reception can be tolerated. If a 31 bit sequence is used which fulfils the criteria mentioned above, then up to nine arbitrary transmission errors can be tolerated, also the maximum of the cross-correlation function being pronounced at the same place and a spacing relative to the secondary maximum still being able to be established.

In FIGS. 3 and 4, the cross-correlation function e (t) of the received bit sequence 5, e.g. 10110111 with the reference sequence without transmission errors and a different number of transmission errors is represented, the ordinate representing the signal quality and the abscissa the time. As can be detected from FIG. 3, the cross-correlation function which is at the same time the autocorrelation function without transmission errors has a pronounced maximum with a height of eight and the spacing relative to the secondary maximum is three. For the quality constant which is set as signal 8 at the output of the correlation unit 6, the height of the correlation maximum, eight here, can be used in conjunction with the spacing relative to the secondary maximum, here three. If only the height of the correlation maximum is chosen, then this should refer to the best possible value.

FIG. 4 shows, by way of example, the cross-correlation function in the case of one transmission error, it being detectable that the main maximum is still very pronounced and the spacing relative to the secondary maximum is still large. Each additional error leads to a reduction in the maximum in the cross-correlation function and to a reduction in the spacing relative to the secondary maximum. If too many errors occur during reception, then the maximum markedness in the KKF disappears, e.g. in the case of a reception level which is too low.

The described current-saving determination of the signal quality or of the received field strength of the received high-frequency signal can serve for estimation of the distance of the receiver circuit (radio nodes 21) from the transmitter 22 and hence for determining movement thereof.

For this purpose, the transmitter 22 transmits its radio signals, i.e. the prescribed bit sequence which is modulated onto the high-frequency carrier preferably by the OOK method, with different transmission powers, for example three different transmission powers, at prescribed time intervals and the radio node with the current-saving receiver receives the radio signals with different received field strengths. In the correlator unit 6, values for the quality constants at the different transmission powers are determined and supplied to an evaluation device 10 which can be a component of the receiver circuit but can also be provided at another place independently of the radio node, the signals 8 for the quality constants then being transmitted via radio. Preferably, the receiver circuit in a radio system which serves for example for theft monitoring is constantly switched on, however it can also be adapted to the temporal sequence of the transmission of the radio signals with graduated transmission power.

As a result of the graduation of the transmission power, the range of the quality constants can be extended. If for example the arrangement according to FIG. 1 was constructed on a free field without shielding, then the reception would be so good that the quality constant would change only for a sufficiently high spacing of the radio node or receiver 21 from the transmitter 22, e.g. only from 50 m. If now the transmission power is reduced by the factor 10, a poorer reception is "artificially" provoked in order that the then established quality constant changes its value even for smaller spacings of the receiver 21 from the transmitter 22, e.g. already from 16 m. If a further graduation of the transmission power is undertaken, for example once again by a power of 10, then a change in the quality constant is again detectable for smaller spacings, e.g. from 5 m. By choosing the number of transmission powers corresponding to a successive degradation, smaller spacings from the transmitter can also be estimated with the quality constant values.

The following case is chosen as an example: three frequencies are transmitted via the radio signals and in fact with a power of:
Power 1: 10 mW
Power 2: 1 mW and
Power 3: 0.1 mW.

Reception by the receiver 21 in its correct position leads to quality constants:
QM1: 31
QM2: 26 and
QM3: 21.

If now the receiver 21 is moved away from the transmitter 22, then the values of the quality constants change to:
QM1: 31
QM2: 25 and
QM3: 10.

Evaluation of the quality constants is now undertaken in the evaluation unit 10, different methods being conceivable. In a simplest form, the values of a sequence of radio signals with different transmission powers can be added in the evaluation unit 10 as a measure of the distance between transmitter and receiver. The respective determination of such a sum over a fairly long period of time and comparison of the respective sums allows a conclusion to be drawn with respect to a change in location, i.e. with respect to a movement if the value of the sum shows a significant deviation relative to the previous one. According to the choice of transmission power graduations, an addition with different weighted QM values can also take place. The type of evaluation must be adjusted finely by means of the graduation of the transmission power in conjunction with the prescribed bit sequence which is used and also the number of graduations of the transmission powers must be taken into account in connection with the receiver which is used, in particular its sensitivity and the prescribed bit sequence used, in particular its code length.

In FIG. 5, QM values are represented as a function of the distance from the transmitter, the curve 11 showing the QM values for the highest power step, the curve 12 showing those of the power step reduced by an order of magnitude and the curve 13 those for a power step reduced once again by a power of 10. If it is assumed that, with a single curve 11, 12, 13 of QM values, there are three different spacing ranges or spacing classes I, II, III, then, with the possibilities represented in FIG. 5, i.e. with a transmitter having three transmission power steps and one receiver, an estimation up to nine spacing classes is possible as a function of the overlapping of the curves. As stated, the graduation of the transmission powers must be chosen in a suitable manner. If the transmission powers are chosen not far enough apart, e.g. 2:1, then overlapping in the QM-versus-spacing characteristic lines can occur. If the transmission powers are chosen too far apart, e.g. 100:1, then gaps in the assignment of QM values relative to spacings are possible. If the codes used are longer, more transmission errors per transmission can be tolerated, i.e. the useable QM value range is increased. Hence a finer QM-to-spacing assignment can be effected.

The above description was undertaken corresponding to FIG. 1 with a transmitter 22 and a receiver 21 and in fact normally a plurality of transmitters is provided, in FIG. 1 four transmitters 22 (TX1, TX2; TX3, TX4) are indicated and for example six receivers 21, however very many more can also be planned. In such a case, a transmitter identification, for example an identification with 8 to 16 bits, is assigned to each transmitter 22 and the prescribed long bit sequence as location sequence, e.g. with 31 bits, can be common to all transmitters 22. The transmitters 22 then transmit cyclically, e.g. at one cycle per minute or at irregular times if required or at the wishes of the user. If a movement is detected, it is sensible in many cases to shorten the transmission period of the transmitters 22 (e.g. from 15 minutes to 1 minute). This can be reported or caused by the corresponding radio nodes. At the established cycle, the OOK-modulated carrier signals with respectively different transmission powers are transmitted in succession and the receivers 21 receive the radio signals from all transmitters 22 and evaluate then respectively in order to form quality constants, i.e. values of the quality constants.

In the following, an example is given with reference to four transmitters 22, namely TX1, TX2, TX3, TX4, with respect to a receiver or radio nodes 21. From the four transmitters 22 at four different locations, the prescribed bit sequence, i.e. the correlation sequence with the transmitter identification bit sequence at five different times t1, t2, t3, t4, t5 are transmitted in sequence at three different transmission powers, received by the radio node 21 and evaluated with respect to the QM values. For the evaluation, the quality constant values are summated respectively at different transmission powers for each transmission t1-t5 and stored as QMTX1 to QMTX4, for example in a RAM, these values then being used for detection of movements taking into account their significant temporal changes.

EXAMPLE

|  | QM TX 1 | QM TX 2 | QM TX 3 | QM TX 4 |
|---|---|---|---|---|
| Transmission t1: | 8 | 2 | 0 | 2 |
| Transmission t2: | 2 | 0 | 7 | 2 |
| Transmission t3: | 1 | 1 | 6 | 2 |
| Transmission t4: | 8 | 0 | 1 | 2 |
| Transmission t5: | 3 | 0 | 1 | 2 |

Each QM value can assume for example the values 0 . . . 8 here.

From transmission t1 to transmission t2, a distance along the propagation path from transmitter TX1 and an approach to transmitter TX3 can be detected. From transmission t2 to transmission t3, the QM change is possibly too small and can possibly be ignored.

If accordingly the difference relative to a QM precursor value QMTX1t2−QMTX1t1=2−8=6 is calculated and a reliability threshold is added, e.g. only from distances greater than 2, then a movement can be concluded. The subtraction can be implemented as a digital circuit with very little complexity and in a current-saving manner. If one should wish to perform for example more complex calculations, e.g. with square roots, then this can be stored in a corresponding value table and a root algorithm can be dispensed with. This value table can be designed as a digital circuit with corresponding minimisations in a combinatory and current-saving manner.

Determination of the direction of movement: in the case of transmission t1 to transmission t4, it can be concluded that a distance from the transmitter TX1 with simultaneous approach to transmitter TX3 and then again a return to transmitter TX1 is effected. The transmitter TX4 shows no significant changes. In the case of sufficiently large changes of one or more QM values, conclusions can be drawn hence with respect to the direction.

In the case of such a monitoring unit, as is represented in FIG. 1, it is then sensible that a central evaluation unit 10 is provided, which unit collects the values of the quality constants for example via a radio transmission of all receivers 21 and undertakes the evaluation with respect to the possible movement, the direction of the movement and possibly the relative position and, in the case of an event, conveys a corresponding report.

The central evaluation unit also offers the possibility of occasionally reading out the QM values collected at each radio node 21. This enables tracking. The reading out is greatly simplified if the history of the respective QM values is transmitted only in the case of a detected movement. If no movement is detected, then an individual, statistical value suffices for the central detection. However, each radio node 21 can basically be itself in the position to detect movement and direction of movement and, in connection with a transmitter situated on the radio node 21, of waking up the existing radio network and causing a central detection.

A further possibility in the presented monitoring according to FIG. 1 can reside in being able to detect foreign objects which are situated within the delimited region 20, however the temporal history requiring to be used, i.e. all values of the quality constants of all receivers must be stored in order that conclusions can be drawn about a foreign object on the basis of the concrete change in the quality constants with respect to respectively the individual transmitters and as a function of time. For this type of monitoring, a larger number of transmitters 22 is however required than those shown in FIG. 1 in order that it can be distinguished whether in fact a distancing of radio node 21 relative to transmitters 22 is effected or whether shielding by a foreign object in a propagation path took place.

The invention claimed is:

1. Method for detecting a movement of at least one receiver, in which radio signals are transmitted from at least one stationary transmitter to said least one receiver and the received signals are evaluated in order to establish a movement, the radio signals being designed as a prescribed bit sequence which is modulated onto a high-frequency carrier and being demodulated by the receiver in order to form a received sequence which is correlated for determining correspondences with the prescribed bit sequence stored as reference sequence, wherein the prescribed bit sequence is chosen such that, for an autocorrelation function, a pronounced maximum with a large spacing relative to one or more secondary maxima is produced and the maximum is stationary even with interferences, wherein quality constants for the received field strength of the received radio signals are determined as a function of the height of the correlation maximum in connection with spacing relative to a secondary maximum established by the correlation of the received sequences with the reference sequence, and wherein the radio signals with the prescribed radio sequence are transmitted in series from the transmitter at at least two different transmission powers and the series is repeated at temporal intervals and the quality constants of the received sequences of the series are evaluated in order to establish a movement of the receiver with respect to the transmitter.

2. Method according to claim 1, characterized in that at least one of the number of different transmission powers and a graduation between the different transmission powers relative to each other are chosen as a function of distance ranges within which a movement is intended to be detected.

3. Method according to claim 1, characterised in that at least three transmitters are provided, to which respectively a transmitter identification is assigned, which is transmitted respectively with the prescribed bit sequence, the prescribed bit sequence being the same for all transmitters or different for each transmitter.

4. Method according to claim 1, characterised in that the quality constants of the received sequences of the radio signals of one series of the at least one transmitter at different transmission powers are added and used as an indication of the movement of the receiver with respect to the transmitter.

5. Method according to claim 3, characterised in that the direction of movement is determined as a function of the quality constants of the at least three transmitters.

6. Method according to claim 1, characterised in that a binary sequence is used for the prescribed bit sequence.

7. Method according to claim 1, characterised in that the received sequence is correlated with the reference sequence according to a cross-correlation function.

8. Method according to claim 1, characterised in that the radio signals are modulated corresponding to the on-off-keying or other multivalent amplitude modulations.

9. Method according to claim 1, characterised in that radio shielding is detected by temporal evaluation of the quality constants of the sequences of transmitted radio signals.

10. Radio system for detecting a movement comprising at least one current-saving analogue receiver, at least one stationary transmitter for transmitting radio signals which are designed as a prescribed bit sequence modulated onto a high-frequency carrier to the at least one receiver in order to form a receiving sequence from the demodulated radio signals and having a current-saving evaluation device which comprises at least one correlator unit and a memory unit for storing the prescribed bit sequence as reference sequence, wherein the prescribed bit sequence is chosen such that, for an autocorrelation function, a pronounced maximum with a large spacing relative to one or more secondary maxima is produced and the maximum is stationary even with interferences, wherein the correlator unit is designed to correlate the received sequence with the reference sequence as a function of the height of the correlation maximum in connection with spacing relative to a secondary maximum established by the correlation, to determine a quality constant for the received field strength of the radio signals at the receiver, and wherein the at least one transmitter is designed to transmit in series the radio signals with a prescribed bit sequence at at least two different transmission powers and to repeat the series at temporal intervals and the evaluation device is designed to evaluate the quality constants of the received sequences of the series in order to establish a movement of the receiver with respect to the transmitter.

11. System according to claim 10, characterised in that the correlator unit is designed to form a cross-correlation function from received sequence and reference sequence.

12. System according to claim 10, characterised in that the receiver has a current-saving demodulator which is designed as an OOK (on-off keying) demodulator or an M-ASK (M-ary amplitude-shift keying) demodulator.

* * * * *